(12) United States Patent
Zhang et al.

(10) Patent No.: US 12,356,134 B2
(45) Date of Patent: Jul. 8, 2025

(54) HEADSET AND CONTROL METHOD WITH USAGE STATUS DETECTION

(71) Applicant: LUXSHARE ELECTRONIC TECHNOLOGY (KUNSHAN) LTD., Kunshan (CN)

(72) Inventors: ZhiZhong Zhang, Kunshan (CN); QingSong Yu, Kunshan (CN); DaHai Xu, Kunshan (CN); RuiBao Liu, Kunshan (CN)

(73) Assignee: LUXSHARE ELECTRONIC TECHNOLOGY (KUNSHAN) LTD., Kunshan (CN)

( * ) Notice: Subject to any disclaimer, the term of this patent is extended or adjusted under 35 U.S.C. 154(b) by 188 days.

(21) Appl. No.: 18/124,761

(22) Filed: Mar. 22, 2023

(65) Prior Publication Data

US 2023/0308798 A1 Sep. 28, 2023

(30) Foreign Application Priority Data

Mar. 23, 2022 (CN) .......................... 202210286229.0

(51) Int. Cl.
H04R 1/10 (2006.01)
G06F 3/16 (2006.01)
H04R 5/033 (2006.01)
H04S 1/00 (2006.01)

(52) U.S. Cl.
CPC .......... *H04R 1/1041* (2013.01); *G06F 3/165* (2013.01); *H04R 1/1008* (2013.01); *H04R 1/105* (2013.01); *H04R 5/033* (2013.01); *H04S 1/007* (2013.01); *H04R 2420/07* (2013.01)

(58) Field of Classification Search
None
See application file for complete search history.

(56) References Cited

U.S. PATENT DOCUMENTS

2010/0040245 A1   2/2010  Buil et al.
2022/0038807 A1*  2/2022  Zhao ................... H04R 1/1091

FOREIGN PATENT DOCUMENTS

CN   104185109 A   12/2014
CN   105554818 A    5/2016
CN   110998713 A    4/2020

(Continued)

*Primary Examiner* — Kenny H Truong
(74) *Attorney, Agent, or Firm* — Birch, Stewart, Kolasch & Birch, LLP

(57) ABSTRACT

A headset for audio play, comprising one or more sensor circuit and a control module. The control module comprises a secondary processor circuit and a primary processor circuit. The sensor circuit generates sensor data according to structural deformations of the headset. The secondary processor circuit receives the sensor data and calculates measured values related to the structural deformations of the headset. The primary processor circuit coupled to the secondary processor circuit controls an audio play operation in the headset, and enters a sleep mode when the audio play operation is not required. The secondary processor circuit determines a usage status of the headset according to the measured value and one or more threshold value. The secondary processor circuit wakes the primary processor circuit according to the usage status, and adaptively adjusts at least one threshold value according to the usage status.

24 Claims, 9 Drawing Sheets

(56) References Cited

FOREIGN PATENT DOCUMENTS

| | | |
|---|---|---|
| CN | 111541970 A | 8/2020 |
| CN | 111988692 A | 11/2020 |
| CN | 113356962 A | 9/2021 |
| CN | 113709622 A | 11/2021 |
| JP | 2014-45312 A | 3/2014 |
| TW | 201828819 A | 7/2016 |
| TW | 202021372 A | 6/2020 |

* cited by examiner

HEADSET AND CONTROL METHOD WITH USAGE STATUS DETECTION

CROSS REFERENCE TO RELATED APPLICATION

This application claims the priority benefit of Chinese Patent Application Serial Number 202210286229.0, filed on Mar. 23, 2022, the full disclosure of which is incorporated herein by reference.

BACKGROUND

Technical Field

The application relates to a headset, in particular, to a headset control method which determines various usage statuses to perform various functions.

Related Art

Conventional headsets often detect a usage status indicating how the headset is used, so as to accordingly perform functions such as playing music or stop playing, and to achieve benefits such as power efficiency. At present, one of the most common way is the utilization of an infrared sensor. However, infrared sensors are often prone to false detection, and are insensitive to various statuses other than wearing and non-wearing.

SUMMARY

In one aspect of application, an embodiment of a headset is provided for audio play, comprising at least a sensor circuit, a control module. The control module comprises at least a primary processor circuit and a secondary processor circuit. The sensor circuit is arranged to operably generate sensor data based on structural deformations of the headset. The secondary processor circuit is arranged to operably receive the sensor data and calculate a measured value from the structural deformations of the headset. The primary processor circuit is coupled to the secondary processor circuit, adaptable for controlling an audio play operation in the headset, and arranged to operably enter a sleep mode when the audio play operation is not required. The secondary processor circuit is arranged to operably determine a usage status of the headset based on the measured value and one or more threshold value. The secondary processor circuit is arranged to operably determine whether to wake the primary processor circuit based on the usage status. The secondary processor circuit is arranged to adaptively adjust at least one of the one or more of threshold values based on the usage status.

In a further embodiment, when the secondary processor circuit determines from the usage status that the headset requires the primary processor circuit to function, the secondary processor circuit issues an event notification to the primary processor circuit, causing the primary processor circuit to be awaken from the sleep mode and to control the headset in response to the usage status.

In a further embodiment, when the measured value is lower than a first threshold value, the secondary processor circuit determines that the usage status is a non-wearing state. When the measured value is greater than or equal to the first threshold value, and lower than a second threshold value, the secondary processor circuit determines that the usage status is an open state. When the measured value is greater than or equal to the second threshold value, and lower than a third threshold value, the secondary processor circuit determines that the usage status is a wearing state. When the measured value is greater than or equal to the third threshold value, the secondary processor circuit determines that the usage status is a stretch state.

In a further embodiment, the secondary processor circuit is arranged to operably monitor the measured value. When the usage status is the non-wearing state, and the secondary processor circuit detects that the measured value is increased to a first value greater than the first threshold value and maintains substantially around the first value for a time period, the secondary processor circuit determines that the usage status is switched to the wearing state, and configures the second threshold value to be the first value subtracting a predetermined offset.

In a further embodiment, the secondary processor circuit configures the third threshold value to be the second threshold value plus a fixed number. When the headset operates in the wearing state, and the secondary processor circuit detects that the measured value is increased to exceed the third threshold value, the secondary processor circuit determines that the usage status is the stretch state.

In another embodiment, when the headset is in the wearing state, and the secondary processor circuit detects that the measured value in increased to exceed a predetermined value within a default time, the secondary processor circuit determines that the usage status is in the stretch state.

In a further embodiment, the headset further comprises a first playback circuit and a second playback circuit, coupled to the primary processor circuit, arranged to be controlled by the primary processor circuit to respectively play first channel audios and second channel audios. An audio capture circuit is coupled to the primary processor circuit, arranged to capture voice inputs. When the headset is in the open state, the primary processor circuit controls the first playback circuit, the second playback circuit and the audio capture circuit to play music or answer calls.

In a further embodiment, the headset further comprises a timer module, coupled to the primary processor circuit and the secondary processor circuit, adaptable for time counting. When the primary processor circuit is not required to perform the audio play operation, the secondary processor circuit monitors a time count in the timer module. When the secondary processor circuit determines through the timer module that the primary processor circuit the time count exceeds a predetermined time value, the secondary processor circuit instructs the headset to power off.

In a further embodiment, when the headset is in the wearing state, and the secondary processor circuit detects based on the measured value that the usage status is changed to the non-wearing state, the secondary processor circuit notifies the primary processor circuit to stop the audio play operation, and notifies the primary processor circuit to enter the sleep mode.

In a further embodiment, when the headset operates in the wearing state, and the secondary processor circuit detects based on the measured value that the usage status is changed to the stretch state, the secondary processor circuit notifies the primary processor circuit to stop the audio play operation, or notifies the primary processor circuit to mute a call.

In a further embodiment, when the secondary processor circuit receives the sensor data, the secondary processor circuit performs a jitter filtering on the sensor data, and cumulates or averages the jitter filtered sensor data collected within a first duration, to generate the measured value.

In a further embodiment, the headset further comprises a wireless communication circuit and a memory device. The wireless communication circuit is arranged to perform a wireless communication with a host device. The memory device is adaptable for storing data and at least one of the one or more threshold values. The secondary processor circuit utilizes the wireless communication circuit to receive from the host device configurations related to the at least one of the one or more threshold values, and to store the configurations in the memory device.

In a further embodiment, the headset further comprises a headband, coupled to the sensor circuit and the control module, arranged to be resilient and providing fixation of the headset. The sensor circuit detects deformations of the headband to generate the sensor data. The sensor data comprises voltage values.

Another aspect of the application proposes an embodiment of a headset control method, for controlling a headset comprising a sensor circuit and a control module, wherein the control module comprises a secondary processor circuit and a primary processor circuit coupled to the sensor circuit. The sensor circuit is utilized to detect structural deformations of the headset to generate sensor data, to receive the sensor data, and to calculate a measured value from the structural deformations of the headset. The primary processor circuit is utilized to control an audio play operation in the headset. When the primary processor circuit is not required to perform the audio play operation, the primary processor circuit enters a sleep mode. The secondary processor circuit determines a usage status of the headset based on the measured value and one or more threshold value. The secondary processor circuit determines whether to wake the primary processor circuit based on the usage status. The secondary processor circuit adaptively adjusts at least one of the one or more threshold values based on the usage status.

The embodiment of the present application highlights at least the following advantages. The sensor circuit in the headset can detect a variety of usage statuses, allowing a variety of control functions to be realized. In addition, the basic monitoring function is conducted through the secondary processor circuit, so that the primary processor circuit can flexibly enter a sleep mode when audio play operation is not required, so as to save more power. Furthermore, one or more threshold values for determining the usage status can be dynamically adjusted to meet the needs of various users. Overall, the embodiments of the application release the potential to serve various additional functions in the headset while improving the power efficiency.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
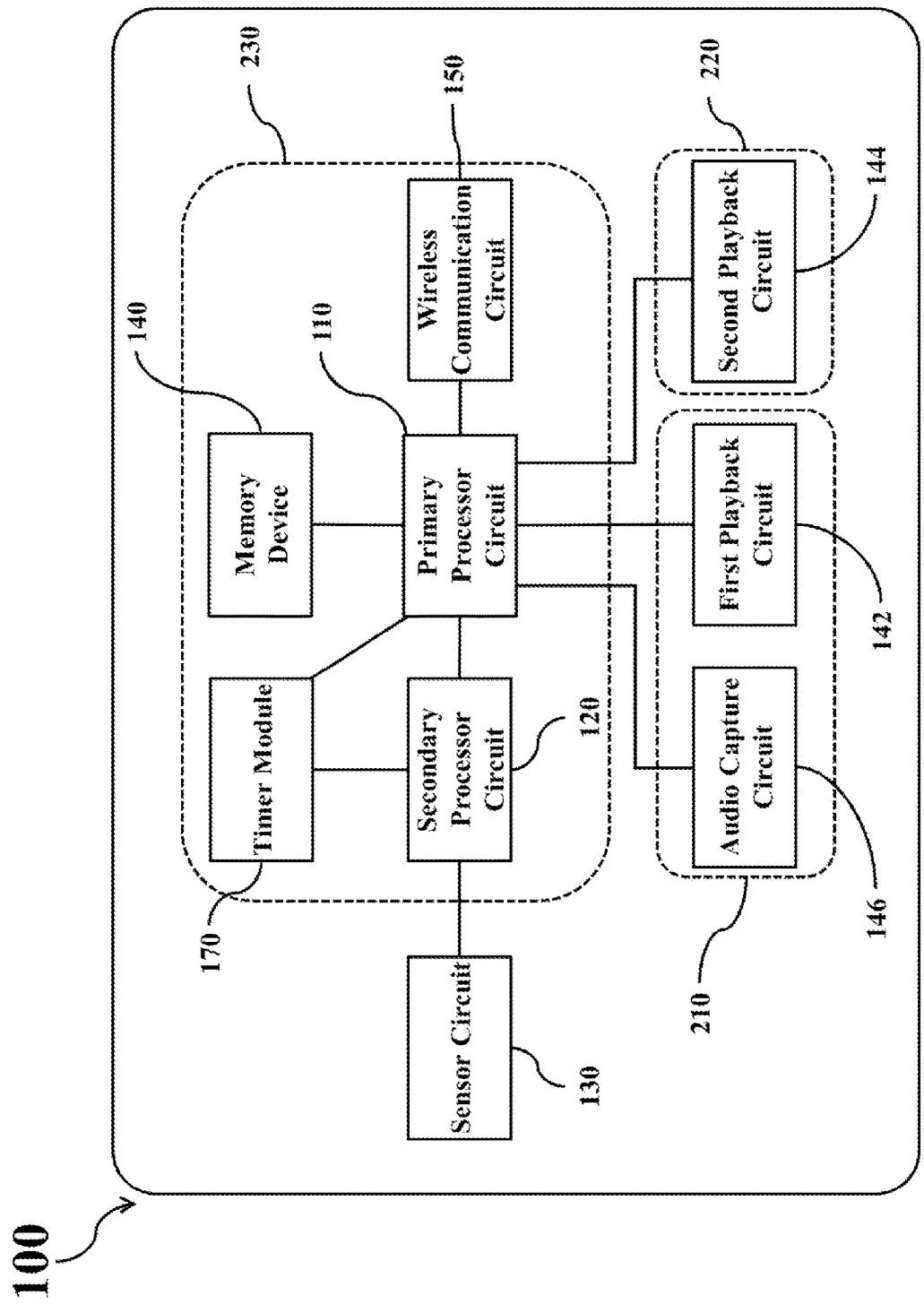
FIG. 1 is a schematic diagram of the headset.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of conducting the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by "include a/an . . . " does not exclude other same elements existing in the process, the method, the article, or the device which comprises the element.

In the following embodiment, the same reference numerals are used to refer to the same or similar elements throughout the invention.

FIG. 1 is a schematic diagram of the headset 100 architecture of the embodiment of the application, explaining the basic electronic functions contained in the headset 100 comprises at least the sensor circuit 130, the first audio module 210, the second audio module 220 and the control module 230.

The sensor circuit 130 is configured to generate sensor data according to the structural deformations of the headset 100. The headset 100 in the embodiment is designed to include an elastic or resilient mechanism, which can change in shape with the wearer's conditions. The sensor circuit 130 can be used to detect the structural deformations caused by a user's wearing action to generate electronic signals, so that components in the headset 100 may process subsequent functions accordingly.

The first audio module 210 comprises a first audio circuit 142 and an audio capture circuit 146, while the second audio module 220 comprises a second audio circuit 144. Since the headset 100 is usually a binaural structure providing stereo effects, the arrangements of the first audio module 210 and the second audio module 220 are respectively corresponded to the user's two ears. The audio capture circuit 146 can be a common microphone or an array of multiple microphones, while the first audio circuit 142 and the second audio circuit 144 can be a common loudspeakers or a sound field array composed of speakers in a variety of different frequency bands. The first audio module 210 with the audio capture circuit 146 is not limited to be worn in the left ear or right ear. In a further embodiment, the audio capture circuit 146 is not limited to be arranged in the first audio module 210, but may also be implemented in the second audio module 220.

the control module 230 comprises at least the secondary processor circuit 120, the primary processor circuit 110, the memory device 140, and the wireless communication circuit 150. As an option, the control module 230 may also include a timer module 170 coupled to the primary processor circuit 110 and the secondary processor circuit 120. The memory device 140 and the wireless communication circuit 150 are coupled to the primary processor circuit 110. The secondary processor circuit 120 is coupled to the sensor circuit 130 and the primary processor circuit 110. The primary processor circuit 110 is also coupled to the first audio circuit 142, the second audio circuit 144 and the audio capture circuit 146.

As shown in FIG. 1, the control module 230 is coupled to the sensor circuit 130, wherein the secondary processor circuit 120 may receive the sensor data generated by the sensor circuit 130 and calculate the measured value of the structural deformations of the headset 100. The primary processor circuit 110 is configured to control an audio play operation performed in the first audio circuit 142 and the second audio circuit 144, or audio capture performed by the audio capture circuit 146 in the headset 100. For example, the primary processor circuit 110 may receive audio signals from other devices through the wireless communication circuit 150 to play through the first audio circuit 142 and the second audio circuit 144. In another embodiment, the memory device 140 may store audio files in advance, allowing the primary processor circuit 110 to read the audio files therefrom and play through the first audio circuit 142 and the second audio circuit 144. Furthermore, the audio file stored in the memory device 140 may be generated by the primary processor circuit 110 controlling the audio capture circuit 146 to capture external sound. The audio file stored in the memory device 140 may also be received wirelessly from other devices through the wireless communication circuit 150 controlled by the primary processor circuit 110.

In the embodiment, the primary processor circuit 110 and the secondary processor circuit 120 are arranged to coordinate with each other. The primary processor circuit 110 is a signal processor or microcontroller with powerful computation capability, capable of integrating and controlling all components in the headset 100. The secondary processor circuit 120, on the other hand, is implemented with a simpler chip of minor computation power than that of the primary processor circuit 110, only needed to be capable of handling sensor data generated by the sensor circuit 130. For example, when the headset 100 is less occupied, such as not performing an audio play operation, the primary processor circuit 110 may be switched to a sleep mode to save power. Meanwhile, the secondary processor circuit 120 keeps monitoring the sensor data of the sensor circuit 130, and determines from the sensor data whether there is an event that needs to wake up the primary processor circuit 110 to function. Thus, when the secondary processor circuit 120 determines that there is a need to wake up the primary processor circuit 110, the secondary processor circuit 120 may promptly send an event notification carrying information of a usage status describing how the headset 100 is used, so that the primary processor circuit 110 can be awakened seamlessly to perform corresponding functions according to the usage status. The event notification may also include further information such as the measured values, allowing the primary processor circuit 110 to determine more operation conditions according to the usage status combined with tracks of the measured values.

The following explains the operation mode of the headset 100 in terms of structural deformations.

Figure 2:
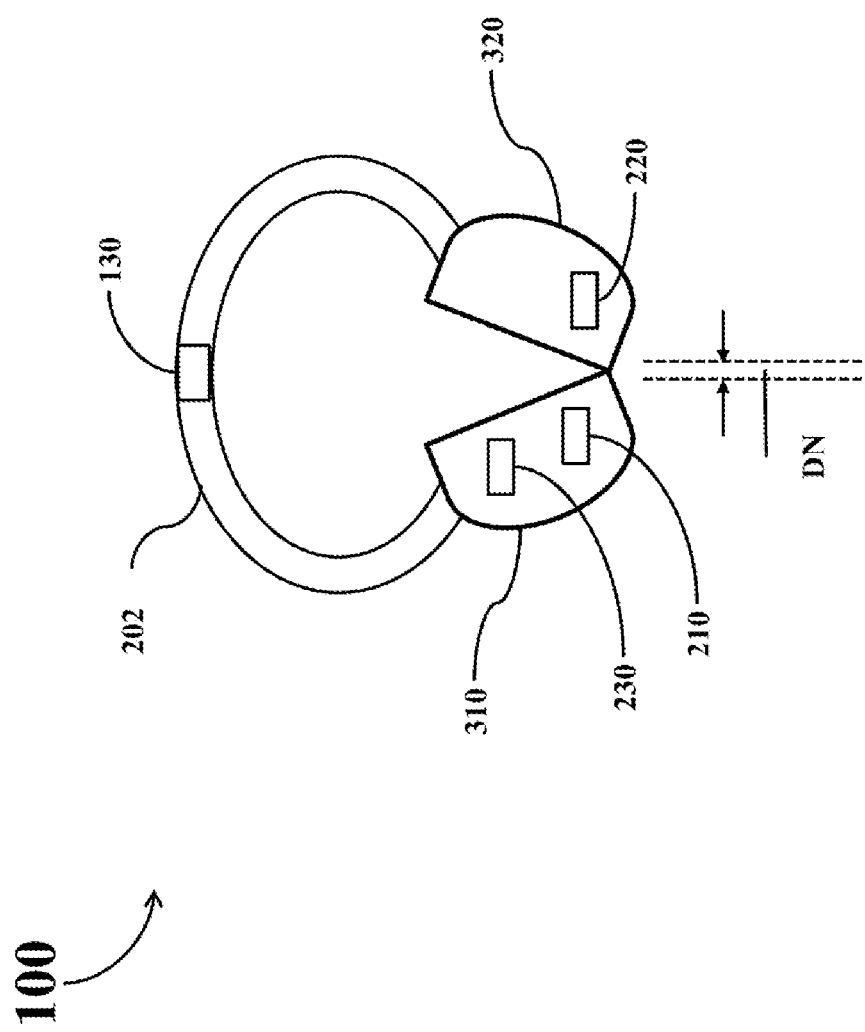
FIG. 2 is a structural diagram of the headset operating in the non-wearing state according to an embodiment of the application.

FIG. 2 is a structural diagram of the headset 100 operating in non-wearing state according to the embodiment of the application. The headset 100 structurally comprises a headband 202, the first earphone part 310 and the second earphone part 320, in addition to the elements in FIG. 1. The headband 202 may be made with material or structure with elasticity or tension, wherein both ends are respectively connected with the first earphone part 310 and the second earphone part 320. As an embodiment, the first audio module 210 and the control module 230 in FIG. 1 are arranged in the first earphone part 310, while the second audio module 220 in FIG. 1 is arranged in the second earphone part 320. When the headset 100 is worn on the head, the headband 202 stretches elastically, so that the user's ears are respectively contacted to the first earphone part 310 and the second earphone part 320 for the playback function. In the embodiment, the sensor circuit 130 is configured on the headband 202, sensing the shape change of the headband 202 due to elastic stretching in use, so that sensor data is generated and sent to the secondary processor circuit 120 in the control module 230. Taking FIG. 2 as an example, when the headset 100 is in the non-wearing state, the headband 202 is free from any stress or tension, and a non-wearing distance DN is naturally posed between the first earphone part 310 and the second earphone part 320.

Figure 3:
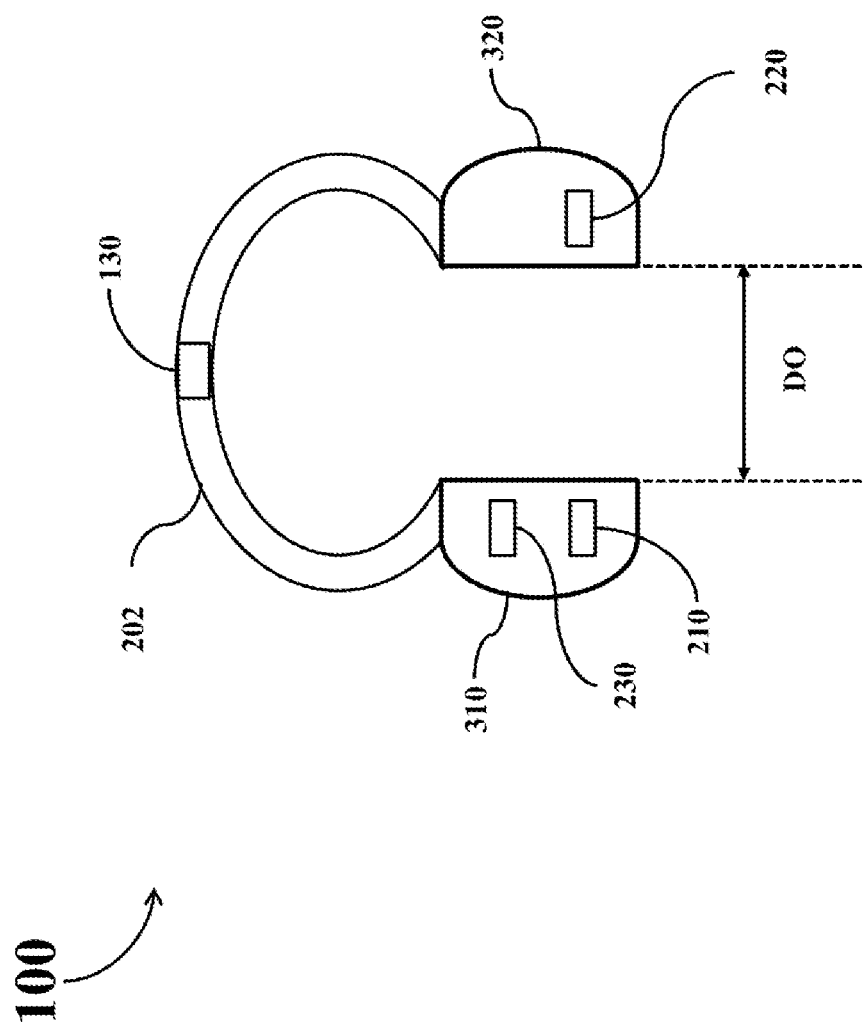
FIG. 3 is a structural diagram of the headset operating in the open state according to an embodiment of the application.

FIG. 3 is a structural diagram of the headset 100 operating in open state according to the embodiment of the application. In the embodiment, the open state is technically a special case in the non-wearing state, wherein the first earphone part 310 and the second earphone part 320 are subject to external forces to produce morphological changes, such as the open state distance DO. In this case, open state distance DO is subsequentially wider than non-wearing distance DN in FIG. 2, but not large enough to be worn on a regular user's head. Through proper configuration and calculation, the sensor circuit 130 may also be able to convert the tension or attitude change on the headband 202 into corresponding sensor data. In practical applications, the open state of the headset 100 may be used in a scenario wherein the user does not want to wear the headset 100 on his head, but still wants to put the headset 100 on the table as a general speaker. As long as the threshold values to figure out the usage status and corresponding workflows are designed, such a use case desired by the user can be feasibly implemented in the headset 100. The advantages of the embodiment are as follows. Unlike conventional headsets that can only be put on the head, a new application mode for the headset 100 is proposed. On the other hand, there is no need to design an added switch button to achieve the function needed in the embodiment. As long as the relative posture of the first earphone part 310 and the second earphone part 320 on the headband 202 is properly adjusted, the sensor circuit 130 is able to sense the condition and trigger successive operations. Therefore, the embodiment is cost-effective.

Figure 4:
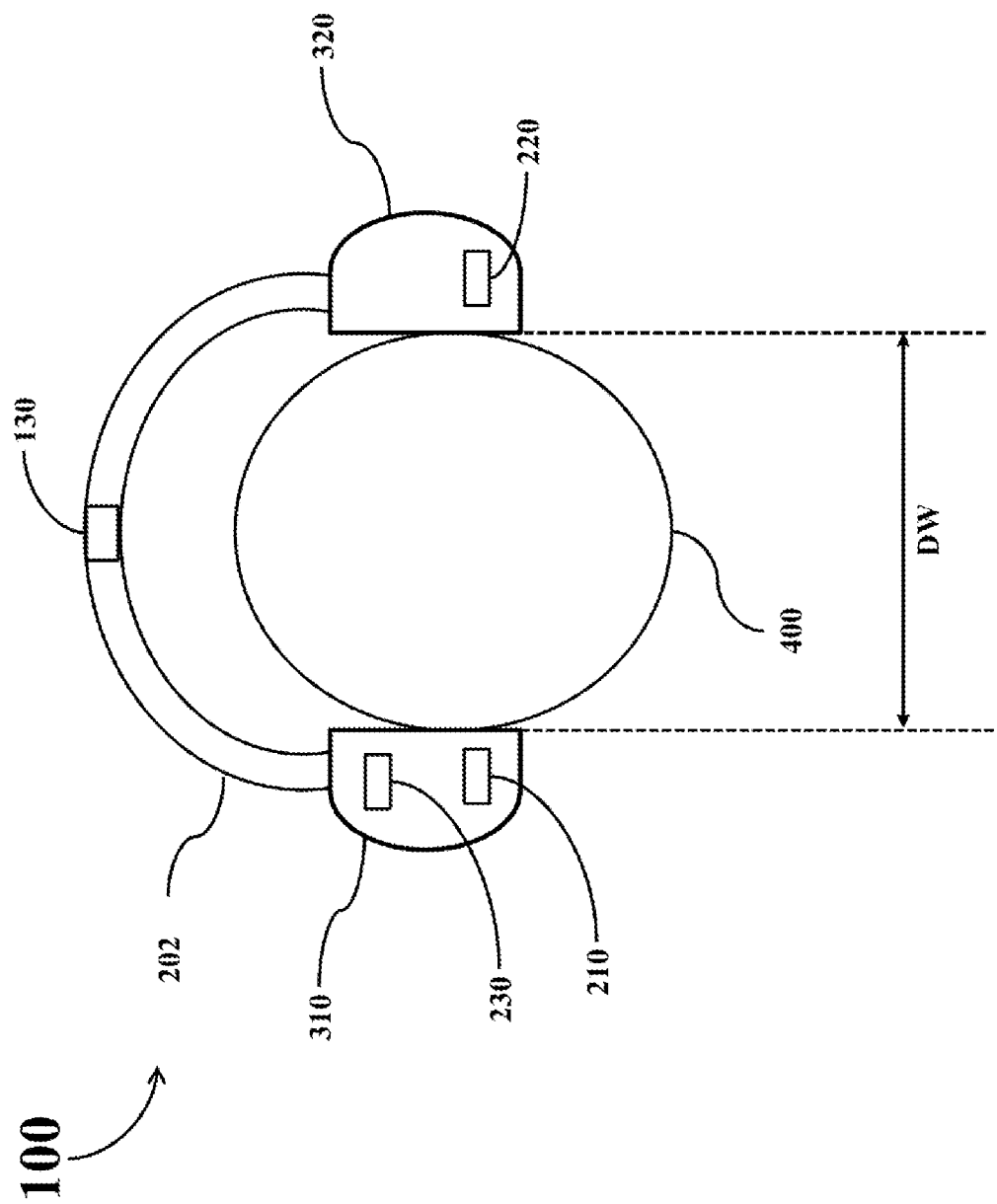
FIG. 4 is a structural diagram of the headset operating in the wearing state according to an embodiment of the application.

FIG. 4 is a structural diagram of the headset 100 operating in wearing state according to the embodiment of the application. The headset 100 in FIG. 4 has been worn on a user head 400. The width of the user head 400 is wearing state distance DW. When wearing the headset 100, an ordinary user must first apply a tensile force to the headband 202 of the headset 100 to make the distance between the first earphone part 310 and the second earphone part 320 greater than wearing state distance DW, and then place the headset 100 on the user head 400. After placement to the user head 400, the elasticity of the headband 202 causes the first earphone part 310 and the second earphone part 320 to be attached to the user head 400, and finally converge stably to wearing state distance DW. It can be understood that in the above process, the sensor circuit 130 may detect significant variations of sensor data due to the condition of the headband 202 in a brief time, which eventually converge to a value corresponding to wearing state distance DW.

Figure 5:
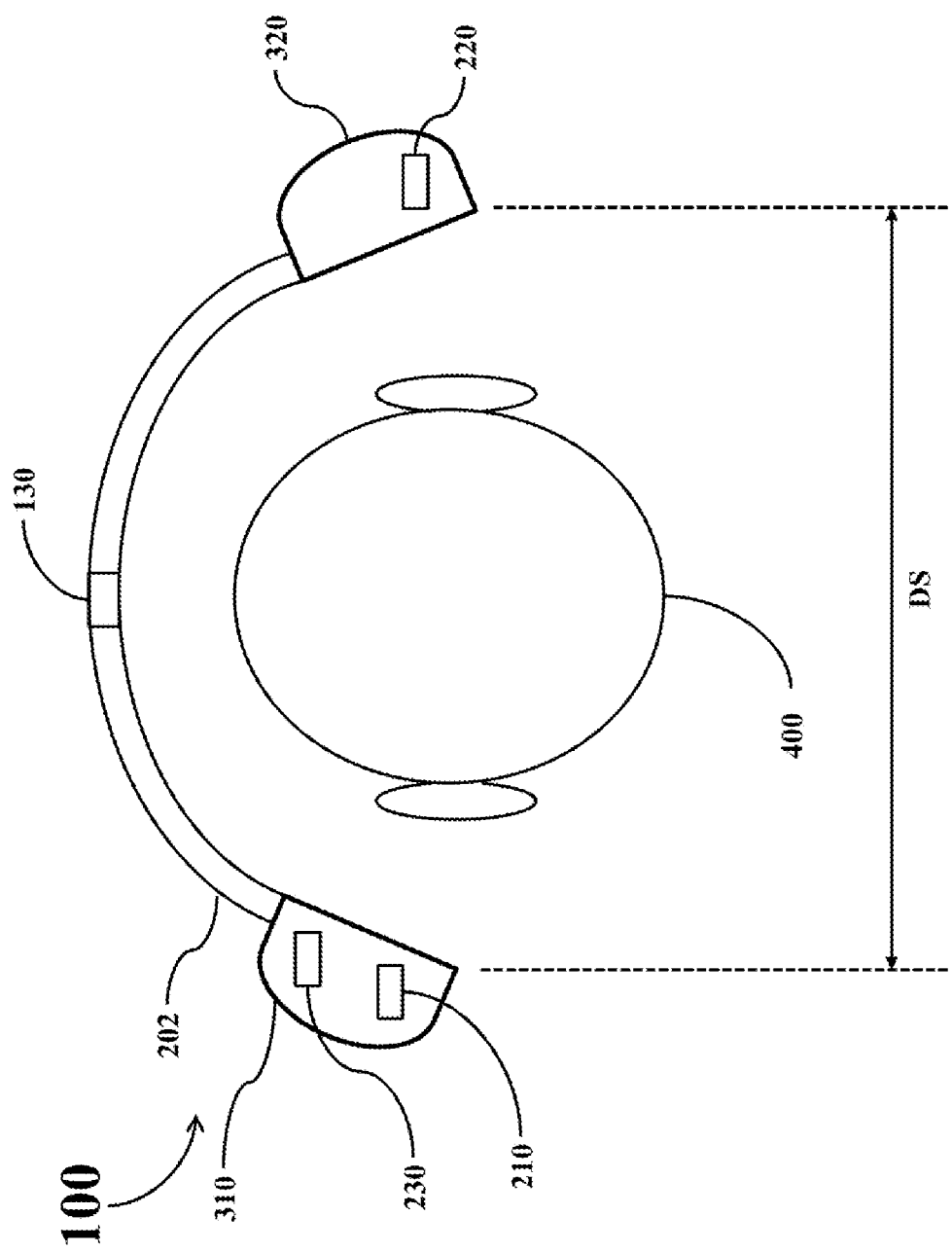
FIG. 5 is a structural diagram of the headset operating in the stretch state according to an embodiment of the application.

FIG. 5 is a structural diagram of the headset 100 operating in stretch state according to the embodiment of the application. When the headset 100 is worn to the user head 400 or removed from the user head 400, it is often necessary to stretch the headband 202 to make the distance between the first earphone part 310 and the second earphone part 320 greater than wearing state distance DW, such as stretch state distance DS, so that it can be worn or removed. Therefore, determination of prying actions may help the secondary processor circuit 120 to find whether the user is putting on or off the headset 100, so as to trigger corresponding functions. Furthermore, the action of prying away can also be used as extra command inputs. For example, while the headset 100 is worn on the user for music listening, if a pry way action is detected that causes the first earphone part 310 and the second earphone part 320 to be stretched above stretch state distance DS, the primary processor circuit 110 can be triggered to pause music or to perform other functions.

Figure 6:
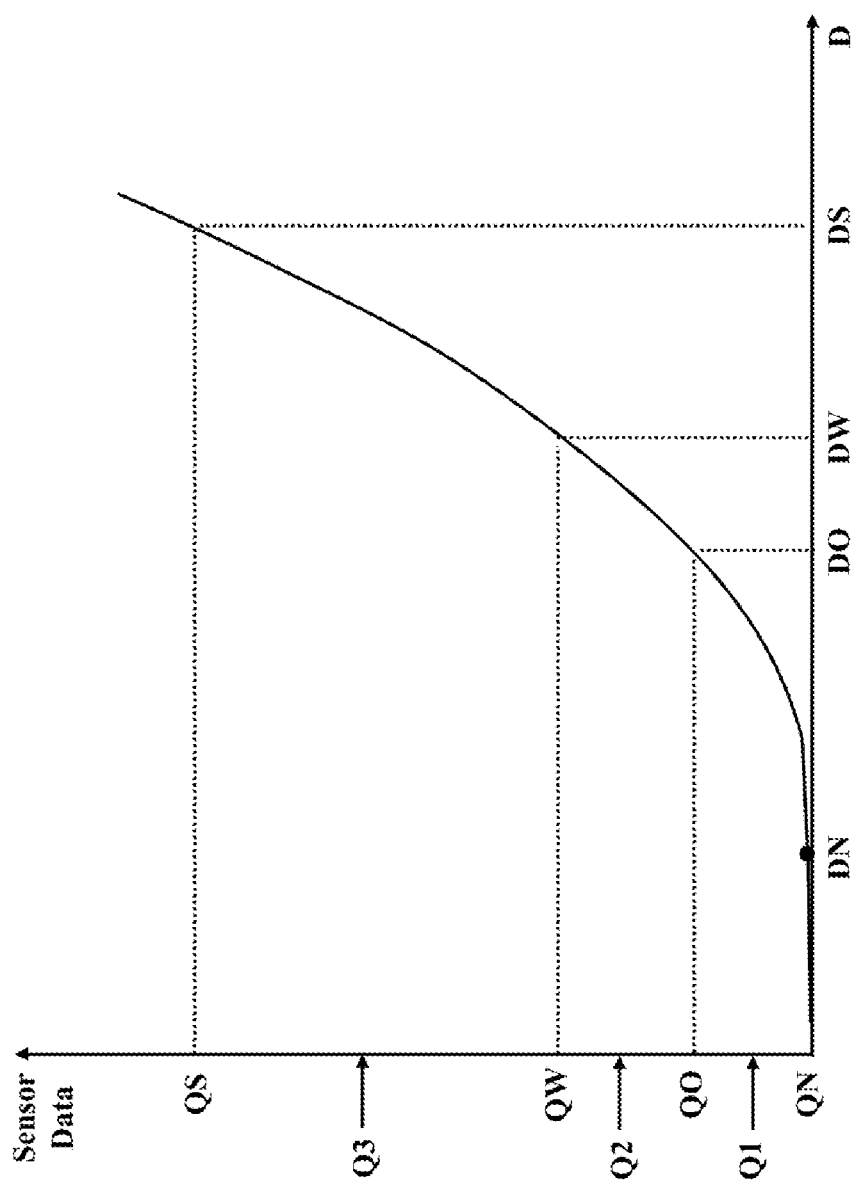
FIG. 6 is a schematic diagram of the relationship between the measured value and the structural features of the headset according to an embodiment of the application.

FIG. 6 is a schematic diagram of relationships between the measured value and the structural features of the headset 100 in the embodiment of the application. The structural deformations of the headband 202 in the earlier embodiment, that is, the relative distance between the first earphone part 310 and the second earphone part 320, presents a specific linear relationship for the sensor circuit 130. For example, when the distance between the first earphone part 310 and the second earphone part 320 is non-wearing distance DN, open state distance DO, wearing state distance DW, and stretch state distance DS, the sensor circuit 130 may obtain sensor data with corresponding non-wearing value QN, open state value QO, wearing state value QW, prying state value QS. In practical use, the sensor data received by the sensor circuit 130 may be presented in the form of voltage or current signals, or may be presented as digital signal. On the other hand, along a time axis (not shown), it can be understood that sensor data may carry jitter noises caused by user actions. Therefore, after the secondary processor circuit 120 of the embodiment receives sensed raw data from the sensor circuit 130, further steps are needed to improve accuracy of determining the usage status. For example, the secondary processor circuit 120 continuously receives the sensor data from the sensor circuit 130 in time, then performs a jitter filtering on the sensor data to mitigate noises generated by the user's action, and performs a hysteresis operation to determine measured values that actually reflect the user actions. The hysteresis operation may comprise accumulating or averaging a plurality of the sensor data continuously collected for a period of time, so as to eliminate the influence caused by instantaneous error and to calculate a more accurate measured value. In a further embodiment, the headset 100 may define some threshold values in-between the measured values corresponding to the aforementioned distances, such as first threshold value Q1, second threshold value Q2, and third threshold value Q3. By monitoring the measured value and comparing the measured value with the threshold values, the usage status of the headset 100 can be determined. For example, the measured values consecutively changed between multiple threshold values can be interpreted as one or more specific command inputs. For example, prying the headset 100 once, twice, or three times within a certain time may be defined as triggers of various functions.

Figure 7:
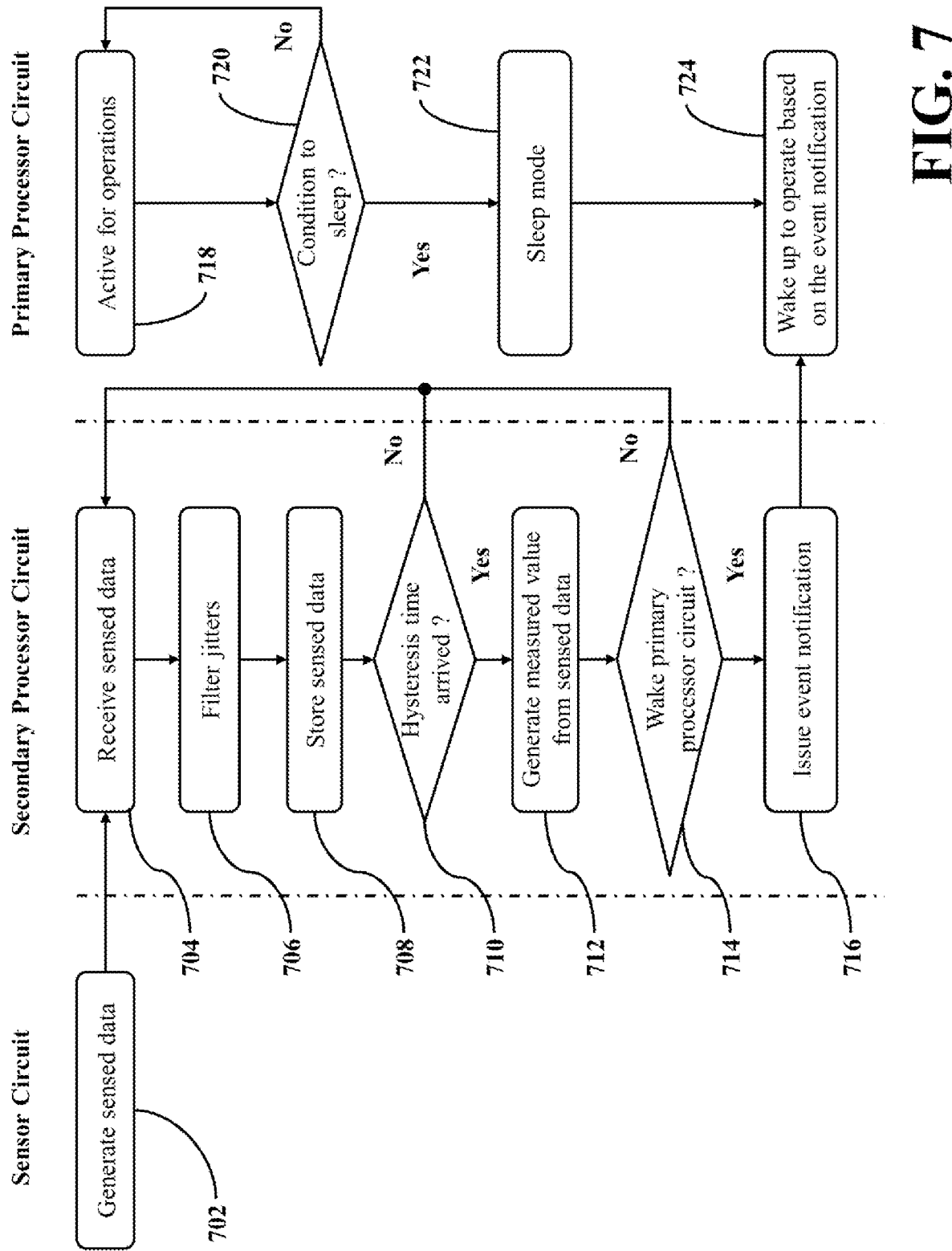
FIG. 7 is a flowchart of the headset control method according to a further embodiment of the application.

FIG. 7 is a flowchart of a handset control method according to an embodiment of the present application. Based on the operation principle of the sensor circuit 130 in FIG. 6, it can be further developed into the embodiment of FIG. 7. To facilitate understanding, the steps of the sensor circuit 130, the secondary processor circuit 120 and the primary processor circuit 110 are divided into three columns in FIG. 7.

Firstly, in step 702, the tension or structural deformations on the headband 202 is sensed by the sensor circuit 130 to generate sensor data.

In step 704, the secondary processor circuit 120 continuously receives sensor data from the sensor circuit 130. Therefore, the form of the received sensor data on the time axis may be presented as a signal waveform similar to the form of voltage or current.

As described, although the sensor data corresponds to the usage status of the headset 100, the sensor data still needs to be calculated and processed to ensure accurate determination. Therefore, in step 706, the secondary processor circuit 120 performs jitter filtering on the received sensor data. The jitter filtering may involve a low pass filter, which cuts high frequency interferences in the user actions. On the other hand, to determine the usage status more accurately, the secondary processor circuit 120 may also employ a hysteresis operation to process sensor data. That is, aggregating, averaging, or statistically analyzing the sensor data collected from a consecutive period of time, to generate the measured value that reflects the usage status. For example, the measured value may be calculated from sensor data collected in three seconds. To achieve the hysteresis operation, the sensor data being collected are temporarily stored in the memory device 140 in step 708. In step 710, the timer module 170 is used to count down a hysteresis time limit. For example, if the elapsed time of sensor data collection does not reach three seconds, the process returns to step 704 to continue receiving sensor data. When the hysteresis time limit is reached, the secondary processor circuit 120 runs step 712 to generate measured value according to the sensor data stored in the memory device 140. Understandably, the method of calculating measured value from sensor data may include summation, average, statistical analysis or a combination thereof. In practical application, the actual formula can be flexibly adjusted according to requirements for the sensitivity and accuracy of sensor data, not specifically limited in the embodiment.

In step 714, when the secondary processor circuit 120 obtains the measured value standing for the current usage status, the secondary processor circuit 120 thereafter determines whether it is necessary to wake up the primary processor circuit 110 to process corresponding operations according to the measured value. If not, the process returns to step 704, wherein the secondary processor circuit 120 keeps watching the sensor data. Conversely, if the secondary processor circuit 120 decides that the currently obtained measured value meets the conditions of particular events that need to be handed over to the primary processor circuit 110 for following operations, in step 716, the secondary processor circuit 120 sends an event notification to the primary processor circuit 110. When the usage status is changed, for example, from the open state to the wearing state, or from the wearing state to the stretch state, step 716 is processed.

On the other hand, the primary processor circuit 110 of the embodiment is designed to conditionally enter the sleep state. For example, the primary processor circuit 110 controls the headset 100 for some regular operations in the described step 718, such as controlling the first audio module 210 and the second audio module 220 to play or capture audio, or controlling the wireless communication circuit 150 to make voice a call with a remote entity. In step 720, when the headset 100 no longer requires the operations and is less occupied, the primary processor circuit 110 is deemed satisfying a criteria to sleep, and therefore switched to the sleep mode in step 722.

Following step 716, in step 724, the primary processor circuit 110 in sleep is awakened after receiving the event notification, and the corresponding control of the headset 100 can be executed according to the information provided in the event notification, such as the current usage status and measured value. The primary processor circuit 110 may operate according to the usage status and measured value after being awakened, which can be, but is not limited to, playing music, making a call, answering a call, pausing playback, adjusting the volume, adjusting the sound effect and other device configuration, fast switching or playback, previous or next song, turning off the power, or triggering the mobile phone to run specific applications.

The embodiment of FIG. 7 illustrates the process of generating sensor data from the sensor circuit 130 and converting it to measured value according to the structural deformations of the headset 100, and describes how the primary processor circuit 110 is matched with the secondary processor circuit 120 to sleep and save power. The present embodiment highlights at least the following advantages. The primary processor circuit 110 and the secondary processor circuit 120 are arranged to be two separate function units. Therefore, when tasks with high power consumption, such as music play or voice call, are no longer needed, the primary processor circuit 110 is allowed to sleep to save power consumption of the headset 100. The secondary processor circuit 120 continuously performs monitor operations with low power consumption. Until an event requiring the primary processor circuit 110 occurs, the secondary processor circuit 120 wakes up the primary processor circuit 110. Based on the operation principle of FIG. 7, the measured value calculated by the secondary processor circuit 120 is further compared with various threshold values to determine the change of usage status, or implement various forms of input instructions to derive diversified control methods. For example, the secondary processor circuit 120 can determine one of the usage statuses of the headset 100 according to the measured value and at least one threshold value, and wake up the primary processor circuit 110 to provide the functions required by the usage status. For example, multiple threshold values may be predetermined in the headset 100, each corresponding to a different usage status. When the measured value is the lower than first threshold value Q1, the secondary processor circuit 120 determines that the usage status is non-wearing state. When the measured value is greater than or equal to the first threshold value Q1 and lower than second threshold value Q2, the secondary processor circuit 120 determines that the usage status is the open state. When the measured value is greater than or equal to the second threshold value Q2 and lower than third threshold value Q3, the secondary processor circuit 120 determines that the usage status is the wearing state. When the measured value is greater than or equal to the third threshold value Q3, the secondary processor circuit 120 determines that the usage status is the stretch state. In a further embodiment, the primary processor circuit 110 is also designed to adaptively adjust one of the threshold values according to the usage status and the measured value, as described in detail below.

Figure 8:
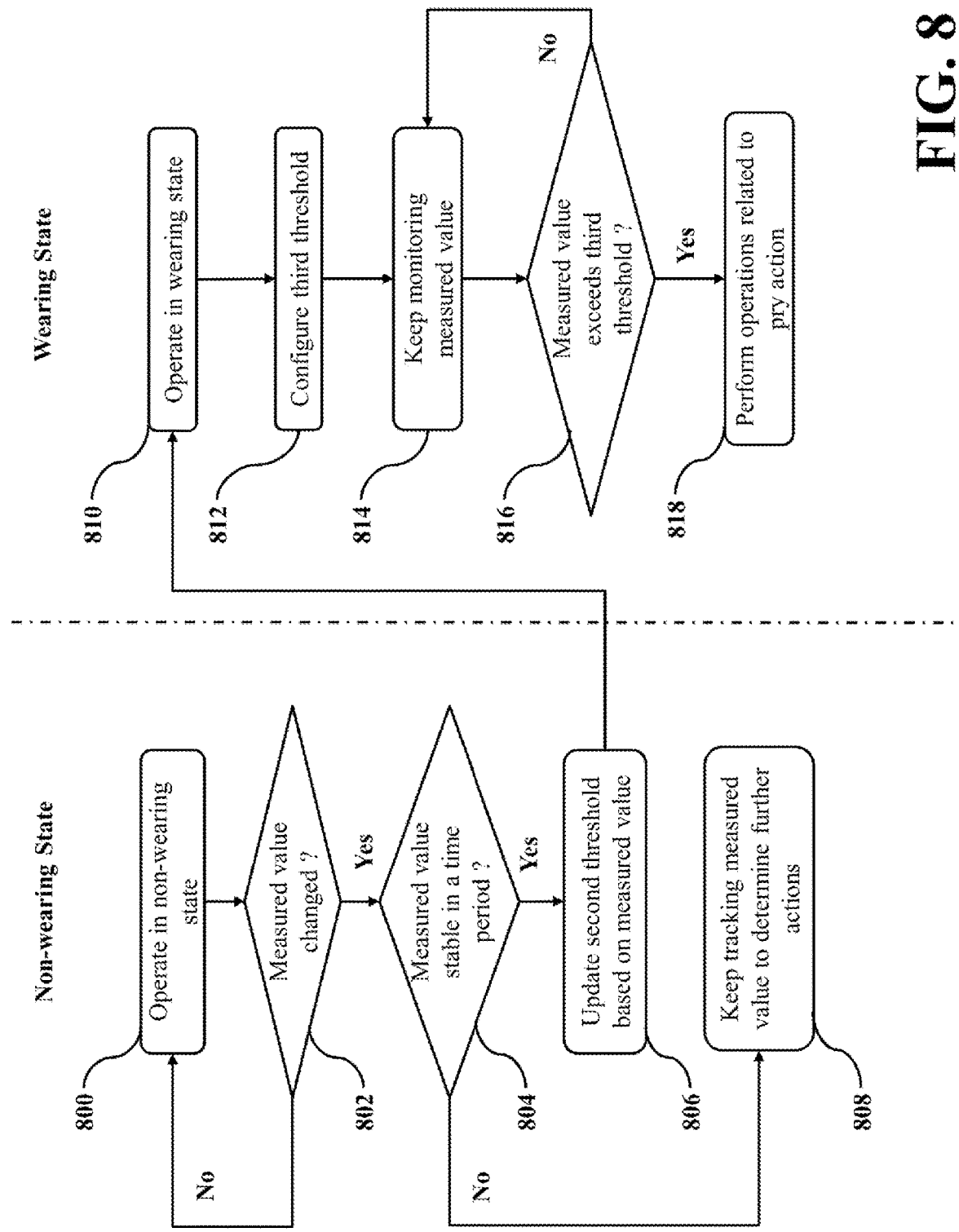
FIG. 8 is a flowchart of the headset control method according to a further embodiment of the application.

FIG. 8 is a flowchart of the handset control method according to a further embodiment of the present application. In the embodiment, the detailed process of switching the headset 100 from the non-wearing state to the wearing state is described. First, in step 800, the headset 100 operates in the non-wearing state. Meanwhile, the distance between the first earphone part 310 and the second earphone part 320 is shown as non-wearing distance DN in FIG. 2. In step 802, the secondary processor circuit 120 determines whether the measured value calculated from the sensor data of the sensor circuit 130 is changed. It can be understood that although the process in FIG. 8 is not specifically described, the operations performed by the secondary processor circuit 120 and the sensor circuit 130 are resident in the background throughout each state, running steps as shown in steps 702 to 714 of FIG. 7.

When a user puts the headset 100 on the user head 400, the sensor circuit 130 first senses a sudden data variation. As the headset 100 is settled on the user head 400, the data sensed by the sensor circuit 130 eventually stay on wearing state value QW corresponding to wearing state distance DW. Therefore, if the secondary processor circuit 120 detects that the measured value is changed in step 802, such as increased to a first value greater than first threshold value Q1, in step 804, the secondary processor circuit 120 further monitors whether the measured value can be maintained around the first value within a time limit, such as three seconds. If step 804 is also true, the secondary processor circuit 120 confirms that the usage status of the headset 100 has been switched to the wearing state.

On the other hand, when the headset 100 is changed from the non-wearing state to the open state, steps 802 and 804 are also applicable to determine whether to enter the wearing state.

After entering the wearing state, since the user head 400 width varies with different user, the sensor circuit 130 of the embodiment determines the wearing state value QW corresponding to the wearing state distance DW to adaptively adjust the threshold value of the wearing state. In step 806, the secondary processor circuit 120 may update second threshold value Q2 according to the measured value given by sensor 130. For example, second threshold value Q2 may be the wearing state value QW subtracting a predetermined offset, so that second threshold value Q2 is in a range lower than wearing state value QW but not less than the range of open state value QO. It is understandable that the predetermined offset can be flexibly determined according to the design requirements of the entity. After confirming the new second threshold value Q2, the headset 100 proceeds to step 810 to operate in the wearing state.

If the measured value does not remain stable in step 804, step 808 is proceeded for further determination. In a further embodiment, the measured value change detected in step 802 may be one of a consecutive command inputs. For example, two or three consecutive prying actions can be defined as commands to run distinct functions. Therefore, in step 808 of FIG. 8, changes of the measured value are further tracked by the secondary processor circuit 120 to identify commands that may be input.

The second threshold value Q2 is configured differently for users with different head sizes, therefore the measured value changes differently when the headset 100 is pried. In step 810, the headset 100 operates in the wearing state. The primary processor circuit 110 may set a new third threshold value Q3 according to the updated second threshold value Q2 in step 812. For example, if second threshold value Q2 is the first value, third threshold value Q3 is a second value calculated from the first value adding a fixed number. It is understandable that the fixed number can be flexibly determined according to the requirements of practical implementations. In step 814, the sensor circuit 130 and the secondary processor circuit 120 likewise, keeps monitoring the measured value. If the secondary processor circuit 120 detects that the measured value is increased to exceed third threshold value Q3 in step 816, the secondary processor circuit 120 deems that the headset 100 is in a stretch state, so that step 818 is proceeded.

Determination of the stretch state may also be implemented in different approaches. For example, when the headset 100 operates in the wearing state in step 810, and the secondary processor circuit 120 detects that the measured value increases by more than a predetermined value within a predetermined time value in step 814, the secondary processor circuit 120 may instantly assert that the headset 100 is in the stretch state.

After the secondary processor circuit 120 determines that a prying action occurs, in step 818, the secondary processor circuit 120 instructs the primary processor circuit 110 or the headset 100 to execute a predefined function corresponding to the prying action.

The embodiment of FIG. 8 highlights at least the following advantages. When different users wear the headset 100, the headset 100 adaptively update the threshold values for determining the usage status according to different head sizes, and further adjust third threshold value Q3 for determining the prying action accordingly. The embodiment allows the headset 100 to be controlled by different users with customizable prying actions, while false action sensing in the secondary processor circuit 120 and the sensor circuit 130 are effectively reduced.

Figure 9:
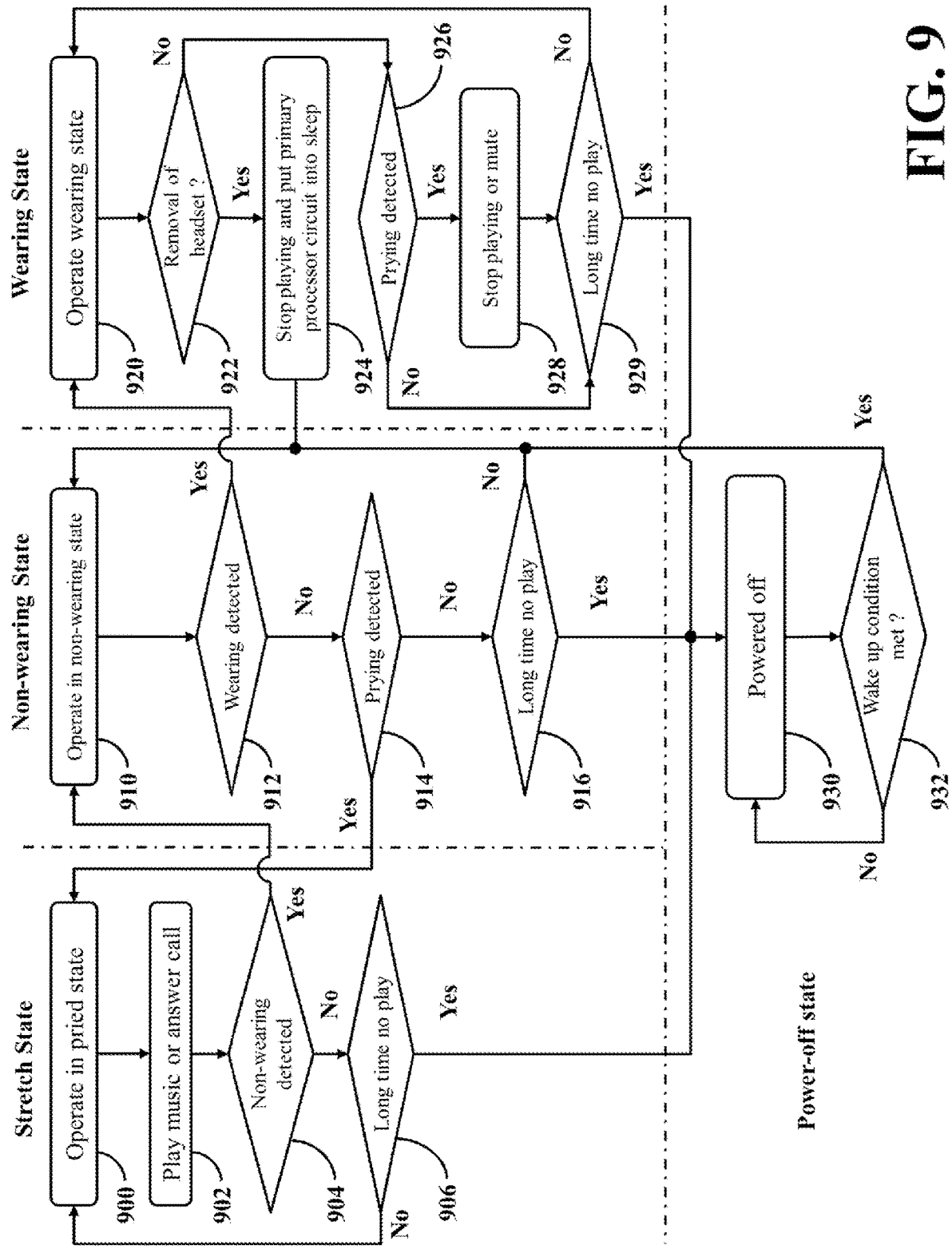
FIG. 9 is a flowchart of the headset control method according to a further embodiment of the application.

The possible functions derived from various measured value changes or prying actions will be illustrated in FIG. 9.

FIG. 9 is a flowchart of the handset control method according to a further embodiment of the present application. The embodiment discusses a state machine diagram of the headset 100 switching between four states based on the usage status. Based on the operation principle introduced in FIGS. 2 to 8, further applications for various states are shown in FIG. 9. The four states include the open state, the non-wearing state, the wearing state, and the power off state. The corresponding processes are presented in different partitions in FIG. 9.

Given that the process starts from step 900, wherein the headset 100 operates in the open state. As shown in FIG. 3, the open state can be a state where the first earphone part 310 and the second earphone part 320 are apart by open state distance DO. The headset 100 may operate as, but not limited to, a desk speaker playing music without putting on the user head 400. In step 902, the primary processor circuit 110 of the headset 100 controls the wireless communication circuit 150, the first audio module 210 and the second audio module 220 to play music or answer a call. The music played may be an audio file read from the memory device 140. In actual operation, the headset 100 also comprises a first audio circuit 142 and the second audio circuit 144 coupled to the primary processor circuit 110, configured respectively to play first channel audio and second channel audio under the control of the primary processor circuit 110. The headset 100 also comprises an audio capture circuit 146, coupled to the primary processor circuit 110, configured to capture voice input. When the headset 100 is in the open state, the primary processor circuit 110 controls the wireless communication circuit 150, the first audio circuit 142, the second audio circuit 144 and the audio capture circuit 146 to play music or make voice calls.

It can be understood that while the steps are processed, the secondary processor circuit 120 and the sensor circuit 130 continue to monitor the sensor data and calculate the measured value in the background. To further optimize the power efficiency, the secondary processor circuit 120 may also enter the sleep mode when certain conditions are met, and is designed to be awaken by the sensor circuit 130. For example, the sensor circuit 130 may transmit a wake-up signal to the secondary processor circuit 120 when a sensed voltage exceeds a predetermined offset.

In step 904, if the secondary processor circuit 120 detects through the measured value of the sensor circuit 130 that a distance D between the first earphone part 310 and the second earphone part 320 changes to non-wearing distance DN and remains stable around non-wearing distance DN, it is determined that the headset 100 is in a non-wearing state, and therefore step 910 is proceeded. On the other hand, if step 904 is not true, the workflow continues to step 906.

In step 906, the secondary processor circuit 120 checks if the headset 100 has not been played for a long time. If yes, the secondary processor circuit 120 actively notifies the headset 100 to power off in step 930. In practical operation, the headset 100 may also include a timer module 170, coupled to the primary processor circuit 110 and the secondary processor circuit 120 to count a time value. The timer module 170 may be implemented by software code executable in the secondary processor circuit 120, or by an independent hardware circuit. When the primary processor circuit 110 is not performing an audio play operation, the secondary processor circuit 120 monitors the time value in the timer module 170. When the secondary processor circuit 120 determines that the primary processor circuit 110 does not play sound for more than a predetermined time limit, for example, ten minutes, then the secondary processor circuit 120 indicates that the headset 100 is powered off.

When the headset 100 is switched to a non-wearing state, the process starts from step 910. In step 910, the headset 100 operates in the non-wearing state. In one embodiment, the primary processor circuit 110 may actively stop playing music and enter the sleep mode as soon as the headset 100 is switched to the non-wearing state. Meanwhile, only the secondary processor circuit 120 and the sensor circuit 130 maintain active to keep the sensor data monitored. In step 912, the secondary processor circuit 120 checks whether the wearing state is detected. If so, step 920 is processed. If not, step 914 is processed. The principle and process of detecting usage status are shown in steps 800 to 806 of FIG. 8, which will not be repeated.

In step 914, the secondary processor circuit 120 also checks whether the open state is detected. In other words, when the distance D between the first earphone part 310 and the second earphone part 320 is changed from non-wearing distance DN to open state distance DO and remains stable around open state distance DO for a period of time, the secondary processor circuit 120 determines that an open state is detected, and therefore processes step 900. If step 914 does not hold, the workflow continues with step 916.

Step 916 is analogous to step 906, wherein the secondary processor circuit 120 checks whether the headset 100 has not been played for a long time. If so, the workflow of the headset 100 proceeds to step 930.

When the headset 100 is switched to the wearing state, the process starts from step 920. In step 920, the headset 100 operates in the wearing state. In one embodiment, the primary processor circuit 110 in the wearing state is awaken from the sleep mode, so as to run various functions in real time, such as voice call, music playback, voice recording, and etc. Meanwhile, in step 922, the secondary processor circuit 120 detects whether the headset 100 is removed from the user head 400. If the secondary processor circuit 120 detects the removal action, in addition to the headset 100 switching to the non-wearing state in step 910, the primary processor circuit 110 also stops current music play, call or recording operation in step 924 to enter the sleep mode. The determination of the removal action, for example, comprises a secondary processor circuit 120 determining the distance D between the first earphone part 310 and the second earphone part 320 through the sensor data of the sensor circuit 130. When the distance D is changed from wearing state distance DW to non-wearing distance DN, and stays stable around non-wearing distance DN for a period, for example, more than three seconds, it is determined that the headset 100 has entered the non-wearing state.

If step 922 is negative, the headset 100 continues to step 926, and the secondary processor circuit 120 cooperates with the sensor circuit 130 to detect whether the headband 202 is stretched. The detailed principle of detecting the prying action is described in steps 810 to 818 of FIG. 8 and therefore is not repeated hereafter. If it is determined in step 926 that a prying action is detected, the primary processor circuit 110 proceeds to step 928 to pause the music play or mute an ongoing voice call. Furthermore, the function corresponding to the prying action may be dependent with ongoing operations. If the music is paused, the prying action un-pauses the music play. If a call rings, the prying action is to pick up the call. Furthermore, a consecutive number of prying actions may be associated to divergent functions, such as music fast turn, previous song, next song, and etc. In summary, based on the sensor data and measured value provided by the secondary processor circuit 120 and the sensor circuit 130, the corresponding running functions can be flexibly defined.

If step 928 is negative, then the headset 100 continues with step 929. Step 929 is analogous to step 916 and step 906. It is determined by the secondary processor circuit 120 whether the headset 100 has not been played for a long time. If so, the headset 100 proceeds with step 930.

In step 930, when the headset 100 is in the power off state, most circuits in the headset 100 stop consuming power. Conventionally, a physical switch is required to turn on a powered off device. The embodiment, on the other hand, utilizes the existed component the sensor circuit 130 to achieve the effect of automatic powering up. The secondary processor circuit 120 and the sensor circuit 130 are further configured to operate continuously with low power consumption. When there is any structural deformation or tension variation on the headband 202, it is inferred that someone may want to use the headset 100. Meanwhile, the secondary processor circuit 120 determines whether the collected sensor data meets a wake-up condition in step 932. If so, the headset 100 is woke up to operate in the non-wearing state. The wake-up condition may comprise the cases where the user actions are detected, such as opening, wearing, and removal of the headset 100.

In a further derived embodiment, the threshold values used to determine various states may be configured through software pre-installed on a host device, such as a mobile phone app, which is then stored in the memory device 140 through wireless communication. When the secondary processor circuit 120 determines the usage status, the threshold values are read from the memory device 140. Alternatively, the secondary processor circuit 120 updates the threshold values, and writes the updated threshold values into the memory device 140.

In a further derived embodiment, the headband 202 of the headset 100 may be an elastic material for providing wearable fixation. The headband 202 can be in the form of a strap or a bracket. After the sensor circuit 130 is combined with the headband 202, the sensor data can be generated according to the elastic deformation state or tension change on the headband 202. As before, the sensor data can be a waveform signal formed by the change of voltage or current, or a digital signal, such as a digital value incremented with a step value 0.34 mv.

The embodiment of the present application highlights at least the following advantages. The sensor circuit 130 of the headset 100 can detect a variety of usage statuses, enabling a variety of customizable control functions. In addition, the basic monitoring function of the secondary processor circuit 120 enables the primary processor circuit 110 to enter the sleep mode when no sound is played, so as to save more power. Furthermore, the threshold value for determining the usage status can be dynamically adjusted to meet unique needs from various users. Overall, the embodiment of the application enables the headset 100 to play more functions and improve efficiency.

In further derived embodiments, the primary processor circuit 110 and the secondary processor circuit 120 can be implemented in the same chip, logically divided into primary and secondary processors, and powered separately. The sensor circuit 130 mentioned in the embodiment may be a pressure sensor, but can also be a deformation sensor to detect the deformation on the headband 202. The sample rate for the sensor circuit 130 to collect the sensor data can be once every 10 milliseconds (MS).

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A headset for audio play, comprising:
a sensor circuit, arranged to operably generate sensor data based on structural deformations of the headset;
a control module, coupled to the sensor circuit, comprising:
  a secondary processor circuit, arranged to operably receive the sensor data and calculate a measured value from the structural deformations of the headset; and
  a primary processor circuit, coupled to the secondary processor circuit, adaptable for controlling an audio play operation in the headset, and arranged to operably enter a sleep mode when the audio play operation is not required;
wherein the secondary processor circuit is arranged to operably determine a usage status of the headset based on the measured value and one or more threshold values;
wherein the secondary processor circuit is arranged to operably determine whether to wake the primary processor circuit based on the usage status; and
wherein the secondary processor circuit is arranged to adaptively adjust at least one of the one or more threshold values based on the usage status.

2. The headset as claimed in claim 1, wherein when the secondary processor circuit determines from the usage status that the headset requires the primary processor circuit to function, the secondary processor circuit issues an event notification to the primary processor circuit, causing the primary processor circuit to be awaken from the sleep mode and to control the headset in response to the usage status.

3. The headset as claimed in claim 1, wherein:
when the measured value is lower than a first threshold value, the secondary processor circuit determines that the usage status is a non-wearing state;
when the measured value is greater than or equal to the first threshold value, and lower than a second threshold value, the secondary processor circuit determines that the usage status is an open state;
when the measured value is greater than or equal to the second threshold value, and lower than a third threshold value, the secondary processor circuit determines that the usage status is a wearing state; and
when the measured value is greater than or equal to the third threshold value, the secondary processor circuit determines that the usage status is a stretch state.

4. The headset as claimed in claim 3, wherein:
the secondary processor circuit is arranged to operably monitor the measured value; and
when the usage status is the non-wearing state and the secondary processor circuit detects that the measured value is increased to a first value greater than the first threshold value and maintains substantially around the first value for a time period, the secondary processor circuit determines that the usage status is switched to the wearing state, and configures the second threshold value to be the first value subtracting a predetermined offset.

5. The headset as claimed in claim 4, wherein:
the secondary processor circuit configures the third threshold value to be the second threshold value plus a fixed number; and
when the headset operates in the wearing state, and the secondary processor circuit detects that the measured value is increased to exceed the third threshold value, the secondary processor circuit determines that the usage status is the stretch state.

6. The headset as claimed in claim 4, wherein:
when the headset is in the wearing state, and the secondary processor circuit detects that the measured value in increased to exceed a predetermined value within a default time, the secondary processor circuit determines that the usage status is in the stretch state.

7. The headset as claimed in claim 3, further comprising:
a first playback circuit and a second playback circuit, coupled to the primary processor circuit, controlled by the primary processor circuit to respectively play first channel audios and second channel audios; and
audio capture circuit, coupled to the primary processor circuit, arranged to capture voice inputs;
wherein, when the headset is in the open state, the primary processor circuit controls the first playback circuit, the second playback circuit and the audio capture circuit to play music or answer calls.

8. The headset as claimed in claim 7, further comprising:
a timer module, coupled to the primary processor circuit and the secondary processor circuit, adaptable for time counting;
wherein when the primary processor circuit is not required to perform the audio play operation, the secondary processor circuit monitors a time count in the timer module; and
when the secondary processor circuit determines through the timer module that a time of the primary processor circuit not performing audio exceeds a predetermined time value, the secondary processor circuit instructs the headset to power off.

9. The headset as claimed in claim 3, wherein:
when the headset is in the wearing state, and the secondary processor circuit detects based on the measured value that the usage status is changed to the non-wearing state, the secondary processor circuit notifies the primary processor circuit to stop the audio play operation, and notifies the primary processor circuit to enter the sleep mode.

10. The headset as claimed in claim 3, wherein:
when the headset operates in the wearing state, and the secondary processor circuit detects based on the measured value that the usage status is changed to the stretch state, the secondary processor circuit notifies the primary processor circuit to stop the audio play operation, or notifies the primary processor circuit to mute a call.

11. The headset as claimed in claim 1, wherein when the secondary processor circuit receives the sensor data, the secondary processor circuit performs a jitter filtering on the sensor data, and cumulates or averages the jitter filtered sensor data collected within a first duration, to generate the measured value.

12. The headset as claimed in claim 1, further comprising:
a wireless communication circuit, arranged to perform a wireless communication with a host device; and
a memory device, adaptable for storing data and at least one of the one or more threshold values; wherein:
the secondary processor circuit utilizes the wireless communication circuit to receive from the host device configurations related to the at least one of the one or more threshold values, and to store the configurations in the memory device.

13. The headset as claimed in claim 1, further comprising:
a headband, coupled to the sensor circuit and the control module, arranged to be resilient and providing fixation of the headset;
wherein the sensor circuit detects deformations of the headband to generate the sensor data; and
the sensor data comprises voltage values.

14. A headset control method, for controlling a headset comprising a sensor circuit and a control module, wherein the control module comprises a secondary processor circuit and a primary processor circuit coupled to the sensor circuit; the headset control method comprises:
utilizing the sensor circuit to detect structural deformations of the headset to generate sensor data;
utilizing the secondary processor circuit to receive the sensor data, and to calculate a measured value from the structural deformations of the headset; and
utilizing the primary processor circuit to control an audio play operation in the headset;
when the primary processor circuit is not required to perform the audio play operation, the primary processor circuit enters a sleep mode;
the secondary processor circuit determines a usage status of the headset based on the measured value and one or more threshold value;
the secondary processor circuit determines whether to wake the primary processor circuit based on the usage status; and
the secondary processor circuit adaptively adjusts at least one of the one or more threshold values based on the usage status.

15. The headset control method as claimed in claim 14, further comprising:
when the secondary processor circuit determines from the usage status that the headset requires the primary processor circuit to function, utilizing the secondary processor circuit to issue an event notification to the primary processor circuit, causing the primary processor circuit to be awaken from the sleep mode and to control the headset in response to the usage status.

16. The headset control method as claimed in claim 14, further comprising:
when the measured value is lower than a first threshold value, the secondary processor circuit deeming that the usage status is a non-wearing state;
when the measured value is greater than or equal to the first threshold value, and lower than a second threshold value, the secondary processor circuit deeming that the usage status is an open state;
when the measured value is greater than or equal to the second threshold value, and lower than a third threshold value, the secondary processor circuit deeming that the usage status is a wearing state; and
when the measured value is greater than or equal to the third threshold value, the secondary processor circuit deeming that the usage status is a stretch state.

17. The headset control method as claimed in claim 16, further comprising:
the secondary processor circuit monitoring the measured value; and
when the usage status is the non-wearing state, and the secondary processor circuit detects that the measured value is increased to a first value greater than the first threshold value and maintains substantially around the first value for a time period, the secondary processor circuit deeming that the usage status is switched to the wearing state, and configuring the second threshold value to be the first value subtracting a predetermined offset.

18. The headset control method as claimed in claim 17, further comprising:
the secondary processor circuit configures the third threshold value to be the second threshold value plus a fixed number; and
when the headset operates in the wearing state, and the secondary processor circuit detects that the measured value is increased to exceed the third threshold value, the secondary processor circuit deeming that the usage status is the stretch state.

19. The headset control method as claimed in claim 17, further comprising:
when the headset is in the wearing state, and the secondary processor circuit detects that the measured value in increased to exceed a predetermined value within a default time, the secondary processor circuit deeming that the usage status is in the stretch state.

20. The headset control method as claimed in claim 17, wherein the headset further comprises:
a first playback circuit and a second playback circuit, coupled to the primary processor circuit, arranged to be controlled by the primary processor circuit to respectively play first channel audios and second channel audios; and
audio capture circuit, coupled to the primary processor circuit, arranged to capture voice inputs; and
wherein the headset control method further comprises, when the headset is in the open state, the primary processor circuit controlling the first playback circuit, the second playback circuit and the audio capture circuit to play music or answer calls.

21. The headset control method as claimed in claim 20, wherein the headset further comprises a timer module, coupled to the primary processor circuit and the secondary processor circuit, adaptable for time counting;
wherein the headset control method further comprises:
when the primary processor circuit is not required to perform the audio play operation, the secondary processor circuit monitoring a time count in the timer module; and
when the secondary processor circuit determines through the timer module that a time of the primary processor circuit not performing audio exceeds a predetermined time value, the secondary processor circuit instructing the headset to power off.

22. The headset control method as claimed in claim 16, further comprising:
when the headset is in the wearing state, and the secondary processor circuit detects based on the measured value that the usage status is changed to the non-wearing state, the secondary processor circuit notifying the primary processor circuit to stop the audio play operation, and notifying the primary processor circuit to enter the sleep mode.

23. The headset control method as claimed in claim 16, further comprising:
when the headset operates in the wearing state, and the secondary processor circuit detects based on the measured value that the usage status is changed to the stretch state, the secondary processor circuit notifying the primary processor circuit to stop the audio play operation, or notifying the primary processor circuit to mute a call.

24. The headset control method as claimed in claim 14, further comprising:
wherein when the secondary processor circuit receives the sensor data, the secondary processor circuit performing a jitter filtering on the sensor data, and cumulating or averaging the jitter filtered sensor data collected within a first duration, to generate the measured value.

* * * * *